United States Patent [19]

Sasaki

[11] Patent Number: 4,800,578
[45] Date of Patent: Jan. 24, 1989

[54] SYNCHRONIZING DETECTING CIRCUIT FOR A DIGITAL BROADCASTING RECEIVER

[75] Inventor: Kazuji Sasaki, Tokyo, Japan
[73] Assignee: Sony Corporation, Tokyo, Japan
[21] Appl. No.: 93,024
[22] PCT Filed: Dec. 25, 1986
[86] PCT No.: PCT/JP86/00651
    § 371 Date: Aug. 27, 1986
    § 102(e) Date: Aug. 27, 1986
[87] PCT Pub. No.: WO87/04310
    PCT Pub. Date: Jul. 16, 1987

[30] Foreign Application Priority Data

Dec. 28, 1985 [JP] Japan .................... 60-297333

[51] Int. Cl.$^4$ .............................................. H04C 7/00
[52] U.S. Cl. ...................................... 375/116; 375/53;
                        375/84; 358/148; 358/264; 358/273
[58] Field of Search ............. 375/106, 53, 54, 84,
                375/85, 114, 116; 358/148, 264, 268, 273

[56] References Cited

U.S. PATENT DOCUMENTS 3,766,316 10/1973 Hoffman et al. ................. 375/116
4,353,130 10/1982 Carasso et al. ................... 375/114
4,573,171 2/1986 McMahon, Jr. et al. ........... 375/114
4,638,497 1/1987 Komatsu et al. ................... 375/116

FOREIGN PATENT DOCUMENTS 54-57812 5/1979 Japan .
58-131767 8/1983 Japan .
58-74757 4/1984 Japan .

Primary Examiner—A. D. Pellinen
Assistant Examiner—Derek S. Jennings
Attorney, Agent, or Firm—Hill, Van Santen, Steadman & Simpson

[57] ABSTRACT

A synchronizing detecting circuit for a digital broadcasting receiver arranged such that serial sync. words of first and second series derived from an output of a 4-phase PSK demodulator (5) are respectively converted into first and second parallel sync. words, all bits of one word of the first and second parallel sync. data are inverted to bits of high level, even-numbered bits (or odd-numbered bits) are exchanged to one another and then supplied resepctively to first and second AND cirucits (38) and (39) and the sync. word is detected from at least one of the AND circuits to thereby detect a synchronizing signal at high probability.

5 Claims, 4 Drawing Sheets

SYNCHRONIZING DETECTING CIRCUIT FOR A
DIGITAL BROADCASTING RECEIVER

TECHNICAL FIELD

The present invention relates to a synchronizing detecting circuit for a digital broadcasting receiver which is suitable for receiving, for example, a satellite broadcasting.

BACKGROUND ART

Generally in a satellite broadcasting, a 4-phase PSK modulation system is employed to digitally transmit various kinds of programs which can be selectively picked up at the reception side.

In this case, a sync. word formed of a plurality of plurality of simultaneous transmission channels and various kinds of program data are sequentially transmitted in a time-division manner within each frame.

In order to receive such satellite broadcasting, it is necessary to provide such a digital broadcasting receiver as shown in FIG. 1.

Referring to FIG. 1, there is shown a parabola antenna 1, and a received signal appearing at the output of the parabola antenna 1 is supplied through a first frequency converter 2, a second frequency converter 3 and an intermediate frequency amplifier 4 to a 4-phase PSK demodulator 5. The signal is demodulated by the 4-phase PSK demodulator 5 so as to provide digital data of a first channel and a second channel. These first channel digital data and second channel digital data developed at the output side of the 4-phase PSK demodulator 5 are supplied to a data decoder 6.

In the data decoder 6, a desired program can be selected from many kinds of programs. Digital data of the selected program is supplied to a digital-to-analog converter 7 and then reproduced through an output terminal 8 to an amplifier and a loudspeaker, though not shown.

By the way, the sync. words inserted into the beginning of each frame of the first and second channels are used to make the digital data of the first and second channels coincident with the contents of the transmission channel at the reception side positively and correctly. Accordingly, in order to select desired program data by the data decoder 6, the sync. words must be detected as the sync. words regardless of the arrangement thereof.

In the digital broadcasting receiver of this example, it is possible to positively and correctly match the digital data of first and second channels with the contents of transmission channel by detecting the sync. word of any one of the first and second channels.

To this end, in the prior art, a synchronizing detecting circuit shown in FIG. 2 is proposed as a synchronizing detecting circuit for a digital broadcasting receiver.

This synchronizing detecting circuit is adapted to detect a sync. word formed of digital data (11100010010), or a so-called Barker Code used by the satellite broadcasting in West Germany.

As illustrated in FIG. 2, there is provided a first channel serial digital data input terminal 10 which is supplied with first channel serial digital data derived from the output of the 4-phase PSK demodulator 5. The first channel serial digital data input terminal 10 is connected to the input side of a shift register 11. Of parallel data output terminals 11a, 11b, ..., 11k of the shift register 11, first, second, third, seventh and tenth parallel data output terminals 11a, 11b, 11c, 11g and 11j are respectively connected to input terminals of an AND circuit 12. Also, fourth, fifth, sixth, eighth, ninth and eleventh parallel data output terminals 11d, 11e, 11f, 11h and 11k are respectively connected through inverters 13, 14, 15, 16, 17 and 18 to the input terminals of the AND circuit 12.

In the thus constructed synchronizing detecting circuit, only when the sync. word (11100010010) is supplied to the shift register 11, parallel digital data (11111111111) are supplied to the input terminals of the AND circuit 12 and a high level signal "1" can be obtained at an output terminal 19 of the AND circuit 12.

Accordingly, this high level signal "1" can be employed as a synchronizing detecting signal.

Such conventional synchronizing detecting circuit for the digital broadcasting receiver, however, can not obtain the synchronizing detecting signal if an error occurs in one bit of the bits forming the sync. word of the first channel. Generally, in a 4-phase PSK-modulated wave, if an error occurs in a certain bit of one channel (for example, bit b3 of a second channel (CH2)), this results in an error in a bit next to the corresponding bit of the other channel (bit a4 of a first channel (CH1)) as shown in FIG. 3. After all, there is a defect that a synchronizing detecting signal can not be obtained so long as neither of the sync. words of first and second channels are perfect.

DISCLOSURE OF INVENTION

In view of the above aspects, the present invention is to provide a synchronizing detecting circuit for a digital broadcasting receiver which can obtain a synchronizing detecting signal with high probability even when an error occurs in the bits forming a sync. word.

According to an embodiment of the present invention, a synchronizing detecting circuit for a digital broadcasting receiver includes, as shown in FIG. 4, first and second serial-to-parallel converting means 20 and 21 for converting serial digital data of first and second series derived from the output of the demodulator 5 to first and second parallel digital data, first and second means for making each bit of the first and second parallel digital data derived from the outputs of the first and second serial-to-parallel converting means 20 and 21 all high in level when the sync. words are supplied thereto and means for re-arranging even-numbered or odd-numbered bits of the first and second parallel digital data derived from the outputs of the first and second means into first and second groups and for judging word data as a sync. word when all bits of at least one of the first and second groups are at high level.

According to the present invention as described hereinabove, the serial digital data of the first and second series derived from the demodulator 5 are respectively converted into the first and second parallel digital data. The first and second parallel digital data are passed through the first and second means which make all bits of the sync. words high in level when the sync. words are supplied thereto. Odd-numbered or even-numbered bits of the first and second parallel digital data derived from the first and second means are re-arranged into the first and second groups. When all the bits of at least one of the first and second groups are at high level, the word data is judged as the sync. word so that even if an error occurs in the bits forming the sync. word, the synchronizing detecting signal can be detected at high probability.

BEST MODE FOR CARRYING OUT THE INVENTION

An embodiment of a synchronizing detecting circuit for use with a digital broadcasting receiver according to the present invention will hereinafter be described with reference to FIGS. 4 to 6.

Figure 1:
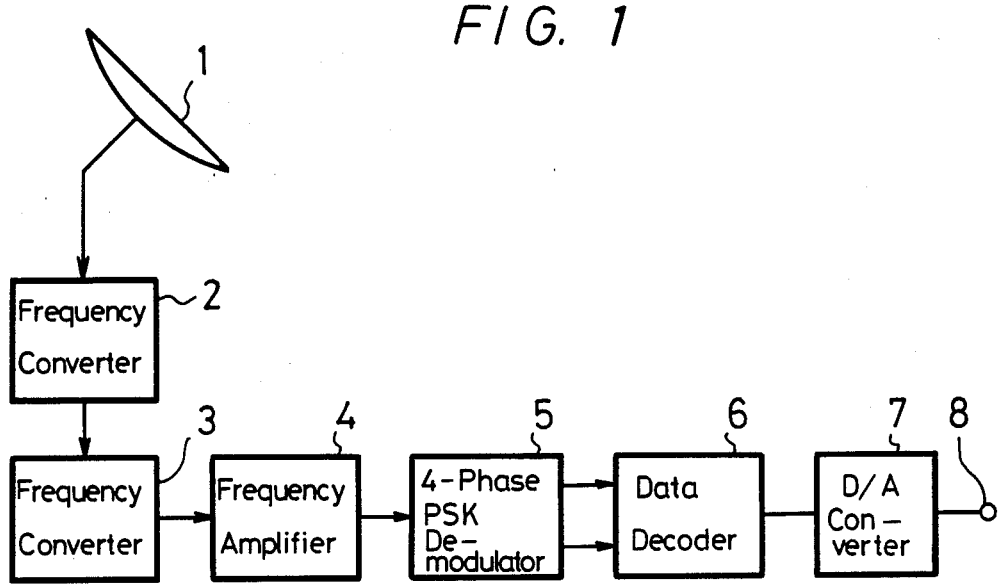
FIG. 1 is a circuit diagram showing an example of a digital broadcasting receiver.
Figure 3:
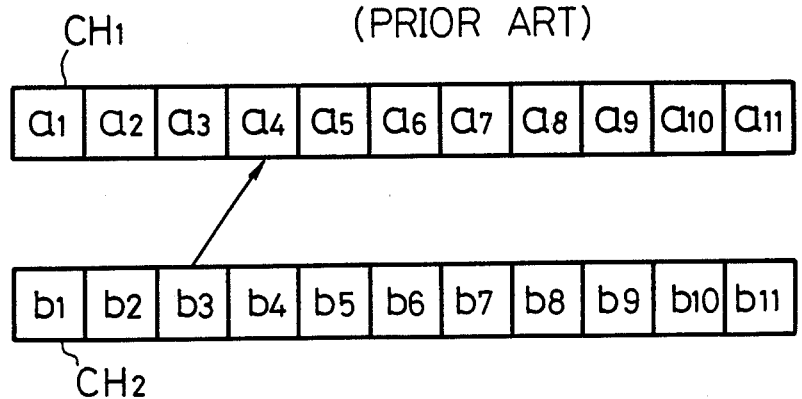
FIG. 3 is a data format used to explain the example of the prior art.

In this embodiment, the present invention is applied to the digital broadcasting receiver shown in FIG. 1, and the sync. words of the first and second channels may be a so-called Barker Code (11100010010) used by the satellite broadcasting in West Germany and an inverted code (00011101101) thereof.

Figure 4:
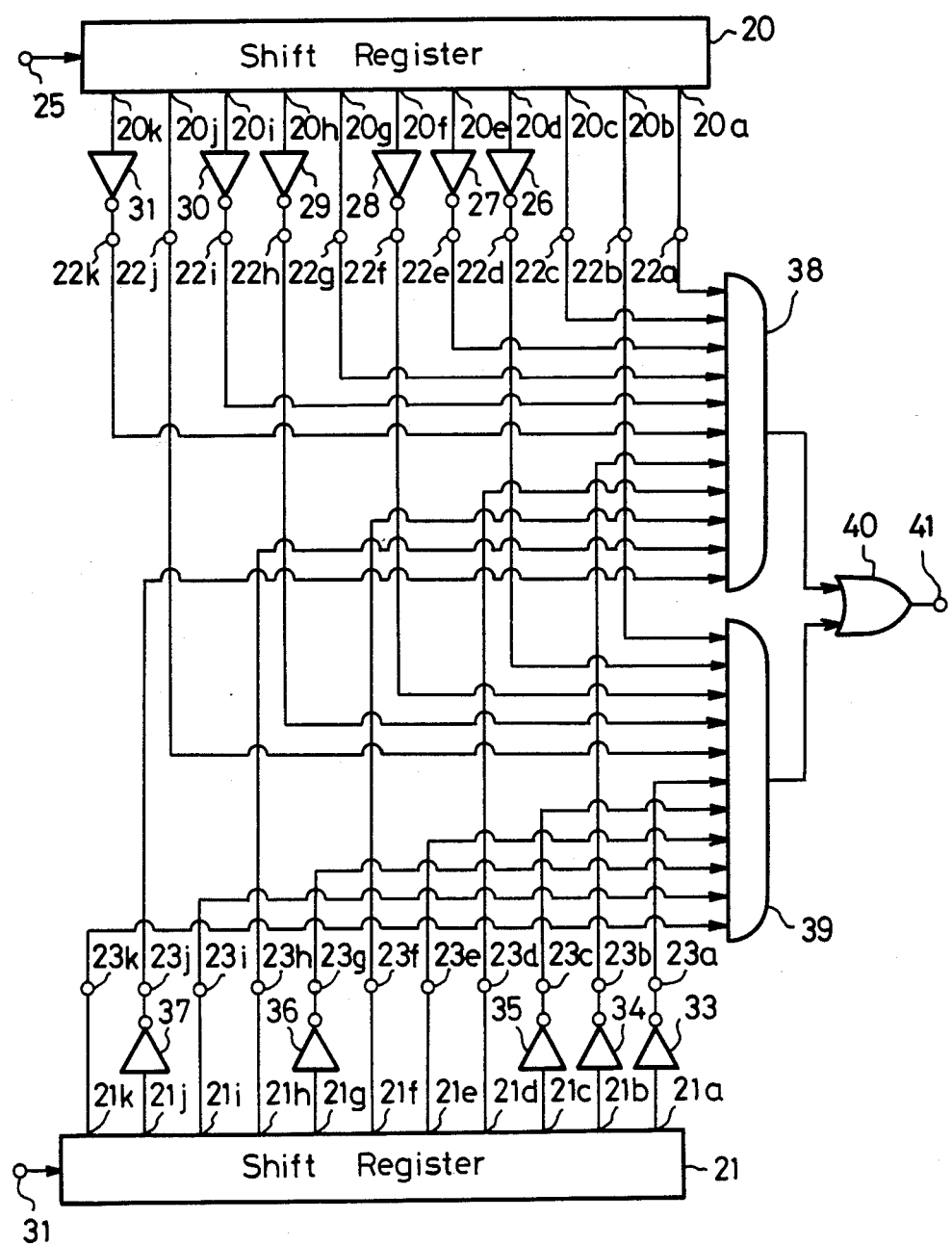
FIG. 4 is a circuit diagram showing an embodiment of a synchronizing detecting circuit for use with a digital broadcasting receiver according to the present invention and FIGS. 5 and 6A–6E are diagrams used to explain the present invention.

Referring to FIG. 4, there is shown a first channel serial digital data input terminal 25 which is supplied with the first channel serial digital data derived from the 4-phase PSK demodulator 5. The first channel serial digital data input terminal 25 is connected to the input side of a first shift register 20, and first parallel digital data resulting from parallel-converting the first channel serial digital data are obtained at parallel data output terminals 20a, 20b, . . . , 20k of the first shift register 20.

Of the parallel data output terminals 20a, 20b, . . . , 20k of the first shift register 20, the first, second, third, seventh and tenth parallel data output terminals 20a, 20b, 20c, 20g and 20j are connected to terminals 22a, 22b, 22c, 22g and 22j, whereas the fourth, fifth, sixth, eighth, ninth and eleventh parallel data output terminals 20d, 20e, 20f, 20h, 20i and 20k are respectively connected through inverters 26, 27, 28, 29, 30 and 31 to the terminals 22d, 22e, 22f, 22h, 22i and 22k. Accordingly, when the sync. word (11100010010) of the first channel is supplied to the first shift register 20, parallel digital data (11111111111) are obtained at the terminals 22a, 22b, . . . , 22k.

Further, there is shown a second channel serial digital data input terminal 32 which is supplied with the second channel serial digital data derived from the 4-phase PSK demodulator 5. The second channel serial digital data input terminal 32 is connected to the input side of a second shift register 21, whereas second parallel digital data resulting from parallel-converting the second channel serial digital data are obtained at parallel data output terminals 21a, 21b, . . . , 21k of the second shift register 21.

Of the parallel data output terminals 21a, 21b, . . . , 21k of the second shift register 21, the first, second, third, seventh and tenth parallel data output terminals 21a, 21b, 21c, 21g and 21j are respectively connected through inverters 33, 34, 35, 36 and 37 to terminals 23a, 23b, 23c, 23g and 23j. At the same time, the fourth, fifth, sixth, eighth, ninth and eleventh parallel data output terminals 21d, 21e, 21f, 21h, 21i and 21k are respectively connected to terminals 23d, 23e, 23f, 23h, 23i and 23k so that when the sync. word (00011101101) of the second channel is supplied to the second shift register 21, parallel digital data (11111111111) are obtained at the terminals 23a, 23b, . . . , 23k.

Of the terminals 22a, 22b, . . . , 22k, the first, third, fifth, seventh, ninth and eleventh terminals 22a, 22c, 22e, 22g, 22i and 22k are respectively connected to input terminals of a first AND circuit 38, whereas the second, fourth, sixth, eighth and tenth output terminals 22b, 22d, 22f, 22h and 22j are respectively connected to input terminals of a second AND circuit 39.

Of the terminals 23a, 23b, . . . , 23k, the first, third, fifth, seventh, ninth and eleventh output terminals 23a, 23c, 23e, 23g, 23i and 23j are respectively connected to the input terminals of the second AND circuit 39, whereas the second, fourth, sixth, eighth and tenth terminals 23b, 23d, 23f, 23h and 23j are respectively connected to the input terminals of the first AND circuit 38. The output terminals of the first and second AND circuits 38 and 39 are connected to first and second input terminals of an OR circuit 40, respectively.

When the output from at least one of the first and second AND circuits 38 and 39 is a high level signal "1", or when respective bits of parallel digital data of at least one of the parallel digital data supplied to the first and second AND circuits 38 and 39 are all at high level "1", the high level signal "1" is obtained at an output terminal 41 of the OR circuit 40.

Figure 5:
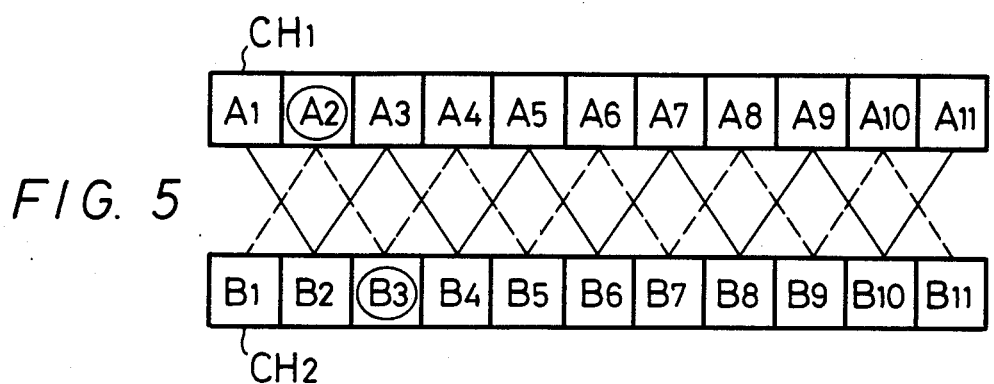

In the thus constructed synchronizing detecting circuit for a digital broadcasting receiver according to this embodiment, (A1 A2 A3 A4 A5 A6 A7 A8 A9 A10 A11) and (B1 B2 B3 B4 B5 B6 B7 B8 B9 B10 B11) assume parallel digital data obtained at the terminals 22a, 22b, . . . , 22k and the terminals 23a, 23b, . . . , 23k as shown in FIG. 5. Then, the odd-numbered bits A1, A3, . . . , A11 of the parallel digital data (A1 A2 . . . A11) obtained at the terminals 22a, 22b, 22k and the even-numbered bits B2, B4, . . . , B10 of the parallel digital data (B1 B2 . . . B11) obtained at the terminals 23a, 23b, . . . , 23k, or the parallel digital data (A1 B2 A3 B4 A5 B6 A7 B8 A9 B10 A11) combined by solid lines in FIG. 5 are supplied to the input terminals of the first AND circuit 38, whereas the even-numbered bits A2, A4, . . . , A10 of the parallel digital data (A1 A2 . . . A11) obtained at the terminals 22a, 22b, . . . , 22k and the odd-numbered bits B1, B3, . . . , B11 of the parallel digital data (B1 B2 . . . B11) obtained at the terminals 23a, 23b, . . . , 23k, or the parallel digital data (B1 A2 B3 A4 B5 A6 B7 A8 B9 A10 B11) combined by broken lines in FIG. 5 are supplied to the input terminals of the second AND circuit 39. Consequently, if all the bits of the parallel digital data of at least one of the parallel digital data (A1 B2 A3 . . . B10 A11) supplied to the input terminals of the first AND circuit 38 and the parallel digital data (B1 A2 B3 . . . A10 B11) supplied to the input terminals of the second AND circuit 39 are at high level "1", a high level signal "1" can be obtained at the output terminal 41 of the OR circuit 40.

When the parallel digital data (A1 A2 . . . A11) and (B1 B2 . . . B11) obtained at the terminals 22a, 22b, . . . , 22k and at the terminals 23a, 23b, . . . , 23k are respectively the sync. words of the first and second channels, even if an error occurs in one bit of one of the sync. words, for example, the bit A2 of the sync. word of the first channel to thereby cause the bit B3 of the sync. word of the second channel to become erroneous, the digital parallel data (A1 B2 A3 . . . B10 A11) supplied to the first AND circuit 38 are not erroneous at all so that the synchronizing detecting signal can be obtained at the output terminal 41 of the OR circuit 40.

Figure 6A:
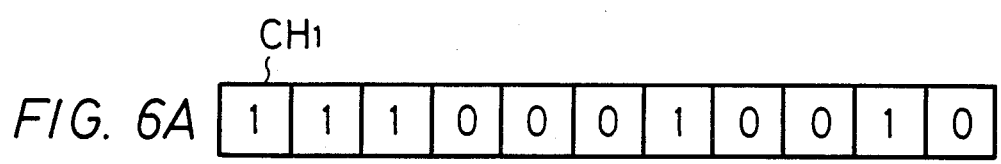
Figure 6B:
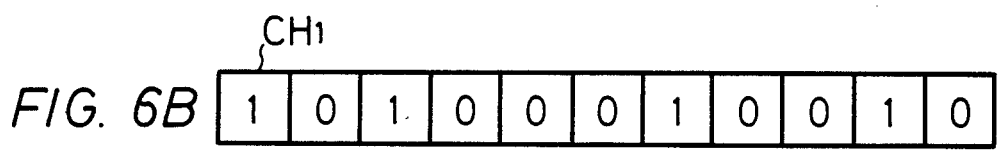
Figure 6C:
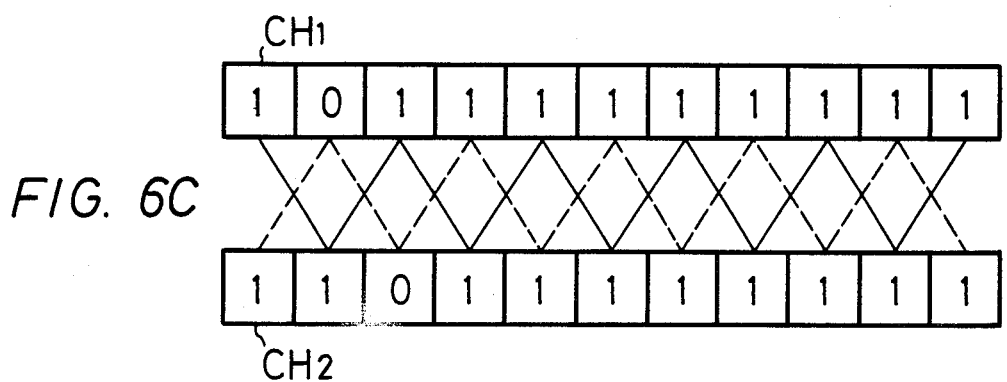
Figure 6D:
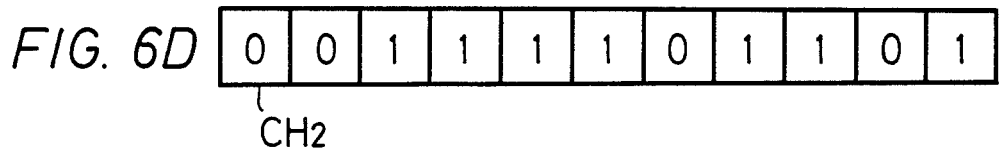
Figure 6E:
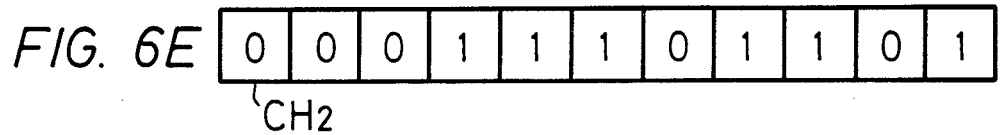

In other words, if an error occurs in the second bit "1" of the sync. word (11100010010) of the first channel shown in FIG. 6A, the sync. word of the first channel becomes (10100010010) as shown in FIG. 6B with the result that the third bit "0" of the sync. word (00011101101) of the second channel shown in FIG. 6E causes an error to make the sync. word of the second channel become (00111101101) as shown in FIG. 6D. If these erroneous sync. words (10100010010) and (00111101101) are respectively supplied through the 4-phase PSK demodulator 5 to the first and second shift registers 20 and 21, the first and second parallel digital data (10111111111) and (11011111111) are obtained at the terminals 22a, 22b, ..., 22k and at the terminals 23a, 23b, ..., 23k as shown in FIG. 6C. In this case, while in this embodiment the parallel digital data (10011111111) combined by broken lines in FIG. 6C are supplied to the second AND circuit 39, the parallel digital data (11111111111) combined by solid lines in FIG. 6C are supplied to the first AND circuit 38 so that the synchronizing detecting signal "1" can be obtained at the output terminal 41 of the OR circuit 40.

Consequently, according to this embodiment, even if an error occurs in one bit of any one of the sync. words of the first and second channels to cause an error to occur in the bit next to the corresponding bit of the other sync. word, it is possible to obtain the synchronizing detecting signal.

Further, even when an error occurs in two bits, if this error occurs in two bits of the parallel digital data (A1 B2 A3 ... A11) or (B1 A2 B3 ... B11) shown in FIG. 5, it is possible to obtain the synchronizing detecting signal. Furthermore, so long as an error occurs either in the parallel digital data (A1 B2 A3 ... A11) or (B1 A2 B3 ... B11), even if the errors are three errors or more, it is possible to obtain the synchronizing detecting signal.

In this connection, let it be assumed that P is a code error rate of one bit. Then, probability at which no synchronizing detecting signal is obtained (synchronizing-broken-probability) in the example of the prior art shown in FIG. 2 can be expressed as $P_0(P) = 1 - (1-P)$. If $P = 10^{-2}$, $P_0(10^{-2}) = 0.1046$ is established, whereas if $P = 10^{-3}$, $P_0(10^{-3}) = 0.0109$ is established.

On the other hand, in this embodiment, if probability $P_1(P)$ at which no synchronizing detecting signal is obtained because of two errors occurred in 11 bits is calculated, $P_1(P) = {}_{11}C_1 \cdot P \cdot {}_5C_1 \cdot P \cdot (1-P)^3/2$. If $P = 10^{-2}$, $P(10^{-2}) \approx 2.53 \times 10^3$ is established. If $P(10^{-3}) \approx 2.73 \times 10^{-5}$ is established.

When $P_0(P)$ and $P_1(P)$ are compared with each other, $P = 10^{-2}$ yields $P_0(P)/P_1(P) = 0.1046/2.53 \times 10^{-3} = 41.3$. While, $P = 10^{-3}$ yields $P_0(P)/P_1(P) = 0.0109/2.73 \times 10^{31\ 5} = 399.3$. In viewing these calculated results, it is apparent that the example of the prior art in FIG. 2 has an extremely high synchronizing-broken probability as compared with that of this embodiment.

Figure 2:
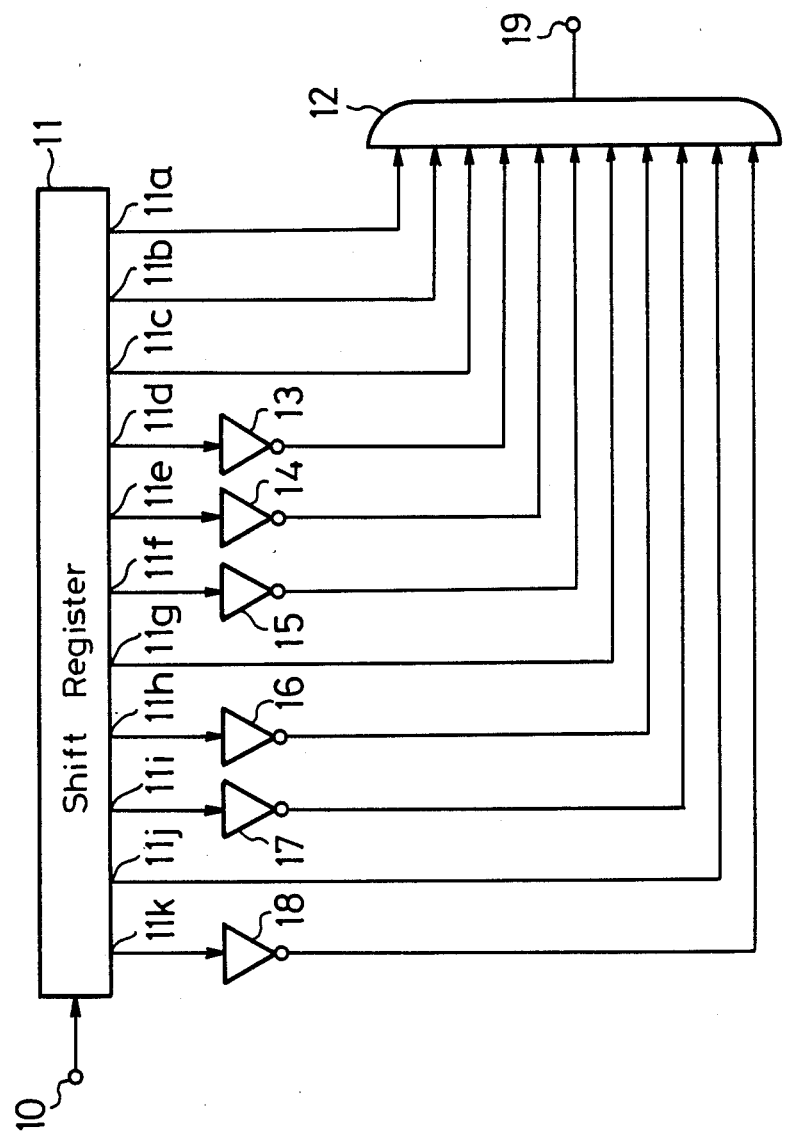
FIG. 2 is a circuit diagram showing a conventional synchronizing detecting circuit.

According to this embodiment, as described hereinabove, the synchronizing detecting signal can be obtained at very low synchronizing-broken probability (1/400 in the case of $P = 10^{-3}$), or at very high probability as compared with the example of the prior art shown in FIG. 2.

While the sync. word of the first channel is formed of parallel digital data (11100010010) of 11 bits and the sync. word of the second channel is formed of parallel digital data (00011101101) of 11 bits in the above mentioned embodiment, it can easily be understood that the sync. words can take various modifications in place of the above one and similar action and effects can be achieved in the latter case.

Also, it is needless to say that the present invention is not limited to the above embodiment but can take various modifications without departing from the gist of the invention.

According to the present invention, the serial digital data of first and second series derived from the output of the demodulator are respectively converted into the first and second parallel digital data. The first and second parallel digital data are passed through the means which make respective bits of sync. words all high in level when the sync. words are supplied thereto. The even-numbered bits or odd-numbered bits of the first and second parallel digital data derived from the outputs of the means are re-arranged into the first and second groups. When all the bits of at least one of the first and second groups are at high level, they are judged as the sync. word. Thus, even if an error occurs in the bits forming the sync. word, it is possible to obtain the synchronizing signal at high probability.

I claim:

1. A synchronizing detecting circuit for a digital broadcasting receiver characterized by first and second serial-to-parallel converting means for converting serial sync. word signals of first and second series derived from an output of a demodulator into first and second parallel sync. word signals, respectively, first and second inverting means for making all bits of said first and second parallel sync. word signals derived at outputs of said first and second serial-to-parallel converting means high in level when said sync. word signals are supplied thereto, and judging means for re-arranging respective bits of even-numbered bits (or odd-numbered bits) of said first and second parallel digital data derived at outputs of said first and second means into sync. word signals of first and second groups and for judging said bits as a sync. word when all the bits of at least one of said sync. word signals of said first and second groups are at high level.

2. A synchronizing detecting circuit for a digital broadcasting receiver according to claim 1, wherein said demodulator is formed of a 4-phase PSK signal demodulator.

3. A synchronizing detecting circuit for a digital broadcasting receiver according to claim 1, wherein said sync. word signal is formed of Barker Code.

4. A synchronizing detecting circuit for a digital broadcasting receiver according to claim 1, wherein said first and second serial-to-parallel converting means are each formed of a shift register.

5. A synchronizing detecting circuit for a digital broadcasting receiver according to claim 1, wherein each of said first and second inverting means includes inverters of an even number.

* * * * *